United States Patent
Ausmus

[11] Patent Number: 5,934,511
[45] Date of Patent: Aug. 10, 1999

[54] DEVICE FOR PUNCTURING AEROSOL CANS

[76] Inventor: Terance K. Ausmus, 754 Pleasant Street, Kamloops, Canada, V2C 3B4

[21] Appl. No.: 08/883,598

[22] Filed: Jun. 26, 1997

[51] Int. Cl.$^6$ ....................................................... B67B 7/00
[52] U.S. Cl. ................................ 222/87; 222/5; 222/83.5; 222/88; 141/97; 141/98; 141/330
[58] Field of Search .................................. 141/51, 97, 98, 141/329, 330; 222/5, 83, 83.5, 87, 88

[56] References Cited

U.S. PATENT DOCUMENTS

| | | | |
|---|---|---|---|
| 2,322,808 | 6/1943 | Hothersall | 222/83.5 |
| 2,796,135 | 6/1957 | Nurkiewicz | 222/83 |
| 3,169,665 | 2/1965 | Colley | 222/5 |
| 3,245,586 | 4/1966 | Haggitt | 222/88 |
| 3,426,942 | 2/1969 | McMains et al. | 222/5 |
| 3,494,506 | 2/1970 | Fujimoto | 222/5 |
| 3,828,976 | 8/1974 | Slidelinker | 222/83.5 |
| 4,961,440 | 10/1990 | Wright | 222/87 |
| 5,265,762 | 11/1993 | Campbell et al. | 222/5 |
| 5,271,525 | 12/1993 | Petrie | 222/5 |
| 5,529,097 | 6/1996 | Campbell | 141/51 |
| 5,732,752 | 3/1998 | Glessner et al. | 141/329 |

*Primary Examiner*—J. Casimer Jacyna
*Attorney, Agent, or Firm*—Antony C. Edwards

[57] ABSTRACT

A device for puncturing aerosol cans has an enclosure having an aerosol can receiving cavity therein, an aerosol can cradle, for supporting aerosol cans, mounted within the aerosol can receiving cavity, and an aerosol can puncturing mechanism mounted within the aerosol can receiving cavity. The aerosol can cradle and the aerosol can puncturing mechanism are mounted in sliding cooperation wherein a selectively rotatable cam member is selectively rotatable by rotation of a handle, rotatably mounted to the enclosure, in a first direction of rotation. Rotation of the handle in the first direction slidingly engages the aerosol cans held in the aerosol can cradle in puncturing engagement with the puncturing pins on the aerosol can puncturing mechanism. Rotation of the handle in a second direction, removes the puncturing mechanism from puncturing engagement from the cans.

12 Claims, 7 Drawing Sheets

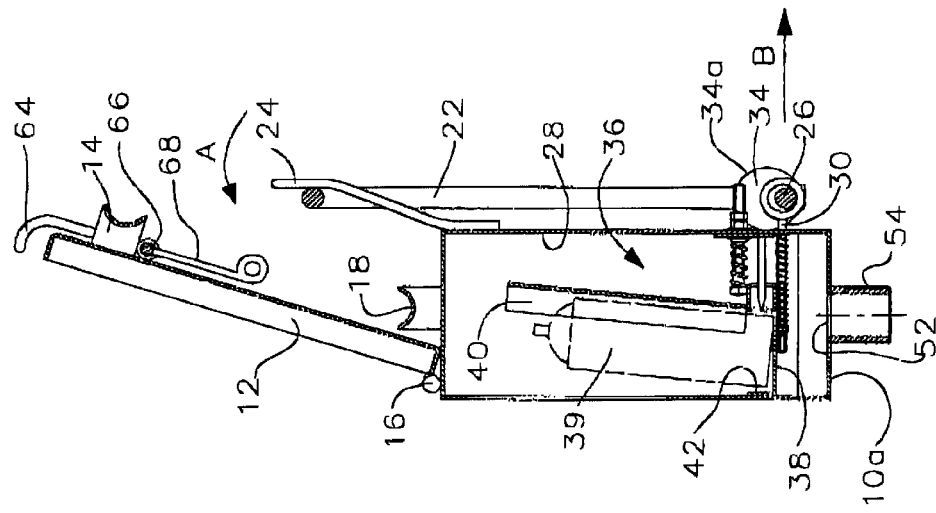
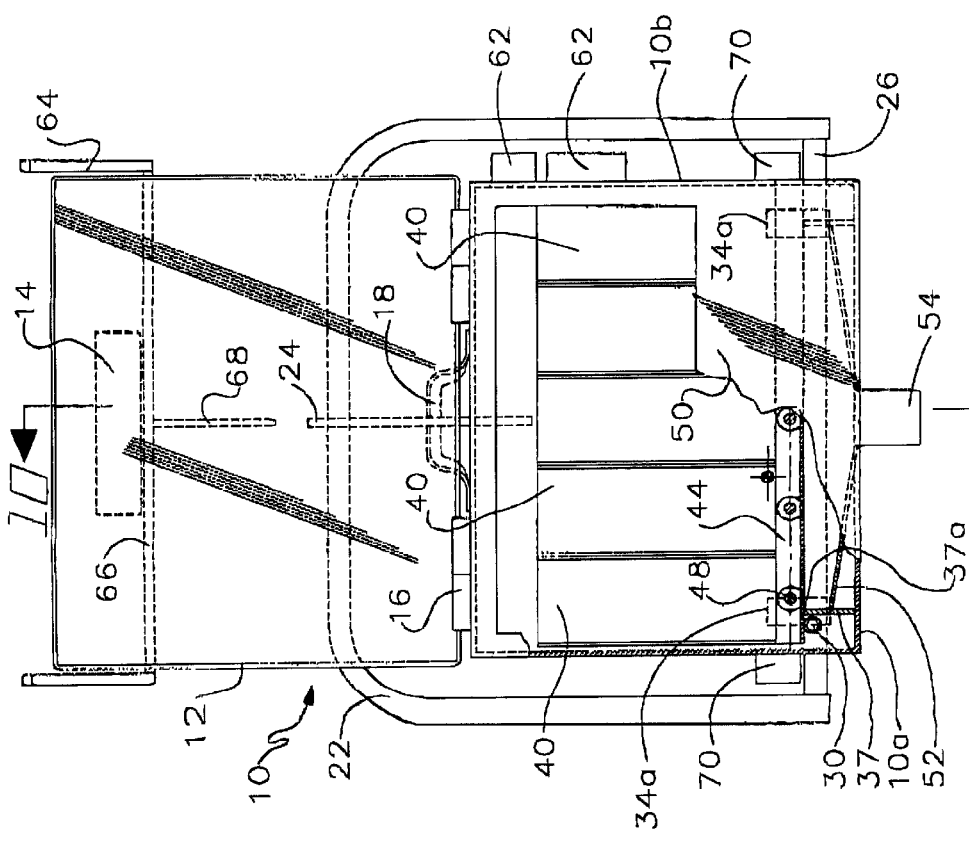

DEVICE FOR PUNCTURING AEROSOL CANS

FIELD OF THE INVENTION

This invention relates to devices for properly disposing of paint containers and in particular pressurized aerosol paint cans.

BACKGROUND OF THE INVENTION

Exhausted aerosol cans, for example spray paint cans, are toxic waste and thus there exists a need for a disposal device which allows for the safe puncturing of such cans so that their liquid contents may be drained and their pressurized contents released into a safe and reusable container such as a 45 gallon drum, so that the drum may then be disposed of as toxic waste once full. The exhausted aerosol cans may then be disposed of in the usual manner by recycling or the like as their contents no longer pose a potential hazard.

SUMMARY OF THE INVENTION

The device of the present invention is an enclosure in which may be supported a plurality of non-punctured aerosol cans and over which, once the aerosol can enclosure is closed, a handle may be lowered to force into the lower sides of the aerosol cans supported within the enclosure a corresponding plurality of pins or rods or like elongate members to thereby puncture and drain any liquid from the bottom of the can and to release any pressurized gases into the enclosure. It is advantageous to puncture the aerosol cans in proximity to the base of the cans, otherwise it has been found typical cans may fold or crease inwardly rather than puncture, and so also to obtain maximum drainage of the contents of the cans. The enclosure drains and vents through a threaded coupling into a 45 gallon drum. The 45 gallon drum is vented to the ambient air through a gas filter to allow the filtered release of gasses escaping from the punctured aerosol cans.

In a preferred embodiment of the device, the aerosol cans are punctured by the action of a camming member rigidly mounted to the handle. The cam rotates when the handle is pulled from an upright position downwardly over the front door of the enclosure, the action of the handle also ensuring that the front door of the enclosure is in the closed position. The cam surfaces on the cam member force the cam member away from the wall of the enclosure, thereby pulling through apertures in the wall of the enclosure a pair of arms attached to a slidingly mounted drawer on which are cradled the array of aerosol cans to be punctured. Thus, rather than the pins being translated so as to be forced into the aerosol cans, the drawer supporting the cans is pulled by the cam member so as to pull the aerosol cans into puncturing engagement with the rigidly mounted pins. As the aerosol cans are pulled into puncturing engagement on the pins, the pins are uncovered by the movement, in the direction of movement of the slidingly mounted drawer, of a return biasing bar having apertures therein corresponding to the location of the pins. The pins protrude through the apertures as the return bar is retracted.

Movement of the drawer, caused by the cam surfaces forcing the cam member away from the enclosure wall, causes the aerosol cans to move the return bar in the same direction as the sliding motion of the drawer thereby exposing the pins. The return bars retracts against a spring biased return force so that once the handle is raised to return it to its vertical position and the cam thereby rotated to return the cam member so as to be adjacent to the back panel of the enclosure, the return bar is forced back against the drawer holding the array of aerosol cans by means of the return biasing force of the springs. The return bar thus pushes the aerosol cans off the pins allowing gasses and liquids to drain from the exposed puncture holes. Typically liquid within the aerosol cans will drain from the exposed puncture holes under the remaining gas pressure within the aerosol cans.

The liquid within the aerosol cans drains from the aerosol cans onto downwardly inclined ramps disposed beneath the drawer so as to exit through a centrally located drain nipple mounted in threaded engagement into the large threaded opening in a 45 gallon drum.

In summary a device for puncturing aerosol cans has an enclosure having an aerosol can receiving cavity therein and an aerosol can cradle, for supporting aerosol cans, mounted within the aerosol can receiving cavity.

Advantageously, the aerosol can puncturing means is mounted within the aerosol can receiving cavity and the aerosol can cradle and the aerosol can puncturing means is mounted in sliding cooperation, wherein a selectively rotatable cam member is selectively rotatable by means of rotation of a handle, rotatably mounted to the enclosure. The rotation of the handle in a first direction of rotation, actuates the sliding cooperation by means of a mechanical linkage between the handle and the cam member. The cam means translates the cradle relative to the cradle so as to drive the aerosol cans in the cradle in a first direction into puncturing engagement with the puncturing means. The handle is rotatable in a second opposite direction of rotation to remove the aerosol can puncturing means from puncturing engagement with the aerosol cans. A dump reservoir mounted beneath the enclosure cooperates with the enclosure by means of a drain between the can receiving cavity and a reservoir cavity within the dump reservoir, so that the aerosol cans may expel their contents into the dump reservoir.

The aerosol can puncturing means is rigidly mounted within the aerosol can receiving cavity. The aerosol can cradle, and the aerosol cans cradled thereon, are selectively slidable into the puncturing engagement with the aerosol can puncturing means, where the puncturing means is at least one elongate pin or other elongate puncturing member (hereinafter collectively referred to as a pin).

Further advantageously, the puncturing means engages the aerosol cans at a lower end of the aerosol cans adjacent a base of the aerosol cans. At least one elongate pin may be generally horizontally disposed, generally perpendicular to a surface of the aerosol cans, and the aerosol cans releasably secured within the aerosol can cradles by releasable securing means.

BRIEF DESCRIPTION OF THE DRAWINGS

FIG. 9 is an enlarged front elevation view of an alternative embodiment of, the aerosol can puncturing enclosure of the present invention.

FIG. 10 is a sectional view along line 10—10 of FIG. 9.

DETAILED DESCRIPTION OF THE PREFERRED EMBODIMENT

Figure 1:
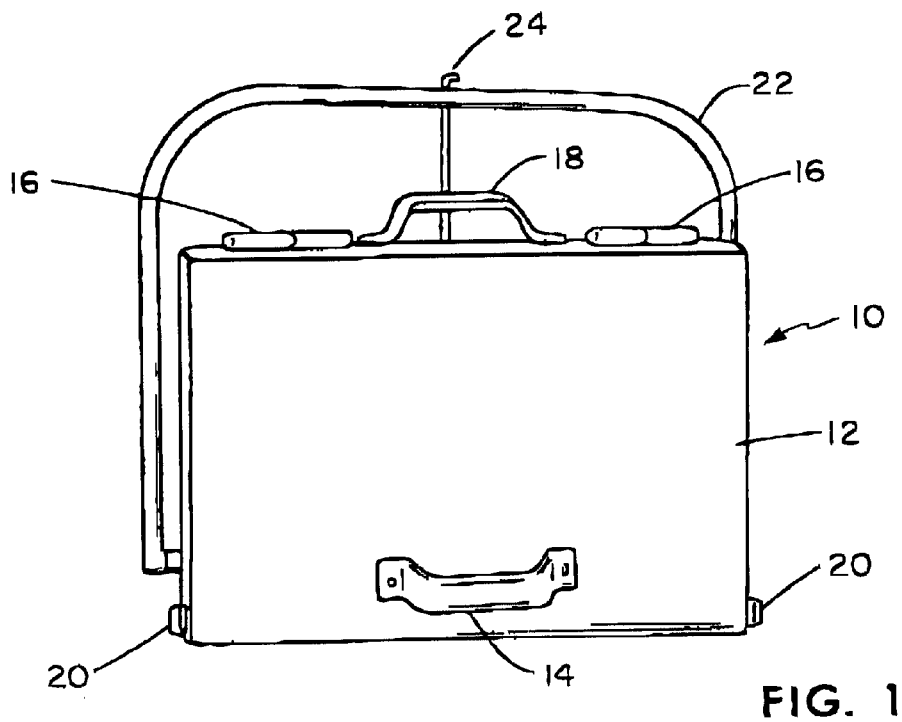
FIG. 1 is, in left side perspective view, the aerosol can puncturing enclosure of the present invention.
Figure 2:
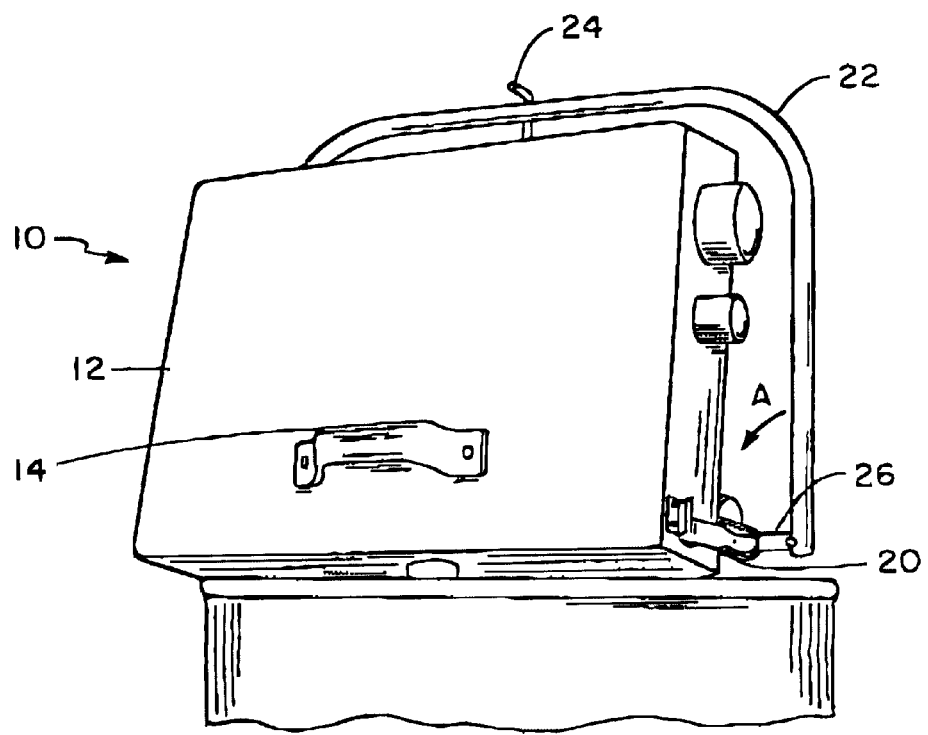
FIG. 2 is, in right side perspective view, the aerosol can puncturing enclosure of FIG. 1.
Figure 4:
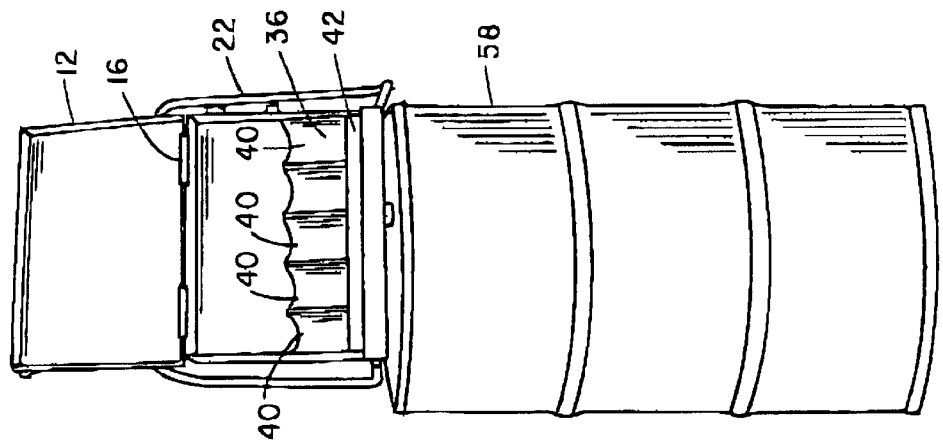
FIG. 4 is, in front elevation view, the aerosol can puncturing enclosure of FIG. 3.

As illustrated in FIGS. 1–4, enclosure 10, which advantageously is constructed of rigid steel so as to withstand an explosion in the event that gasses escaping from an aerosol can within the enclosure ignite, has a front door 12 which may be opened by pulling handle 14 so as to rotate front door 12 upwardly about hinges 16. Handle 18 may be provided as a convenience for ease of transport of enclosure 10. Front door 12 may be secured in the closed position as illustrated by means of latches 20.

Figure 5:
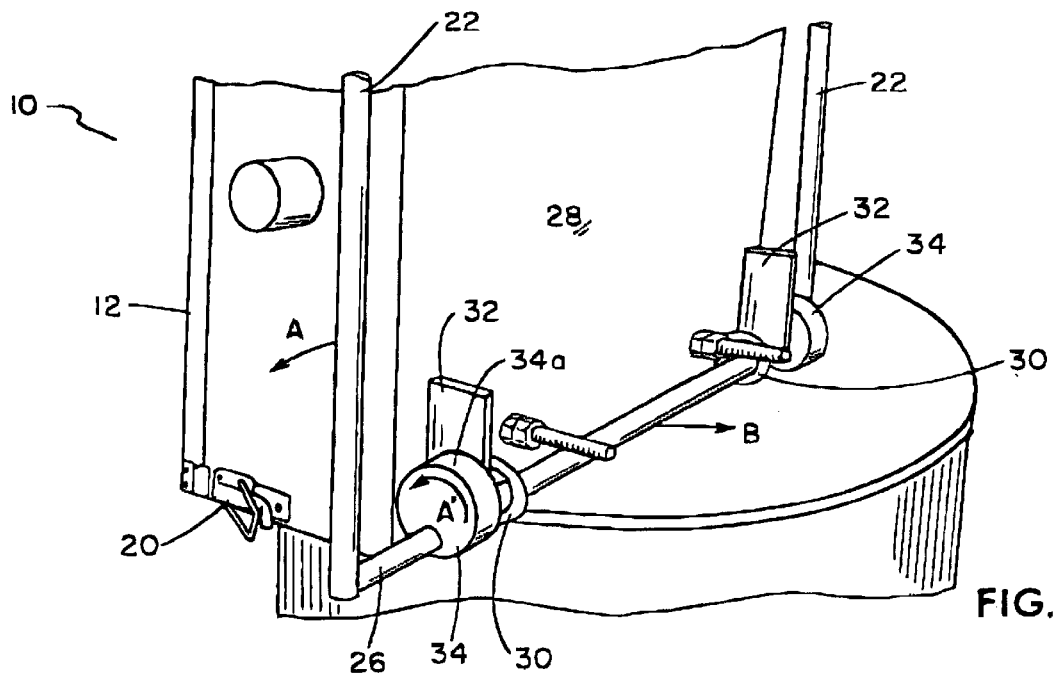
FIG. 5 is, in right side rear perspective enlarged view, the base of the aerosol can puncturing enclosure of FIG. 3.
Figure 6:
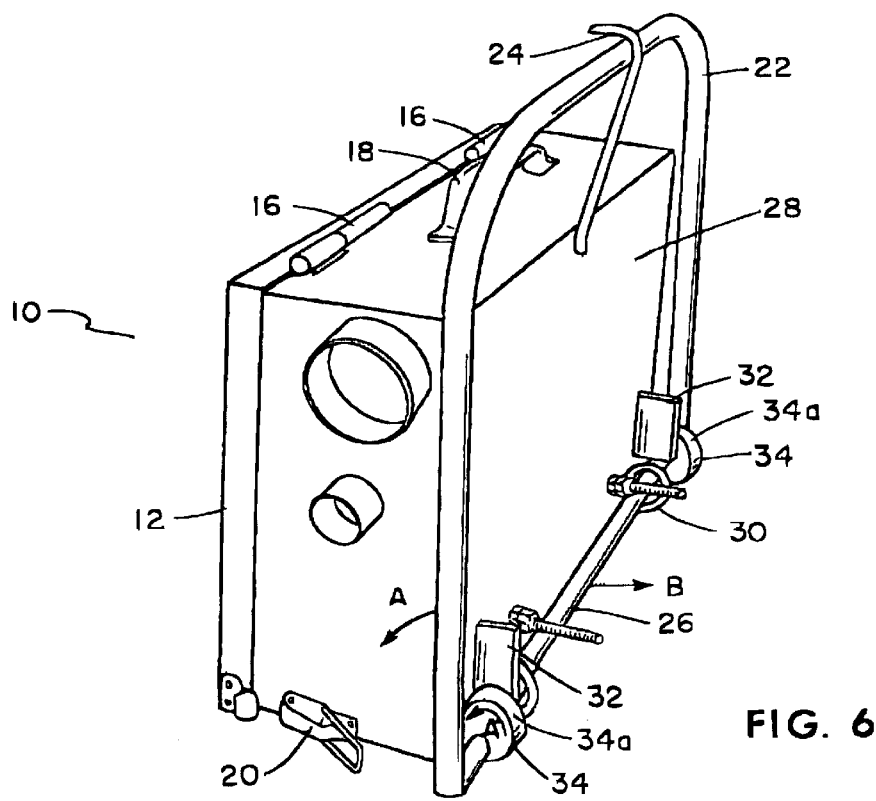
FIG. 6 is, in right side rear perspective view, the aerosol can puncturing enclosure of FIG. 1.
Figure 7:
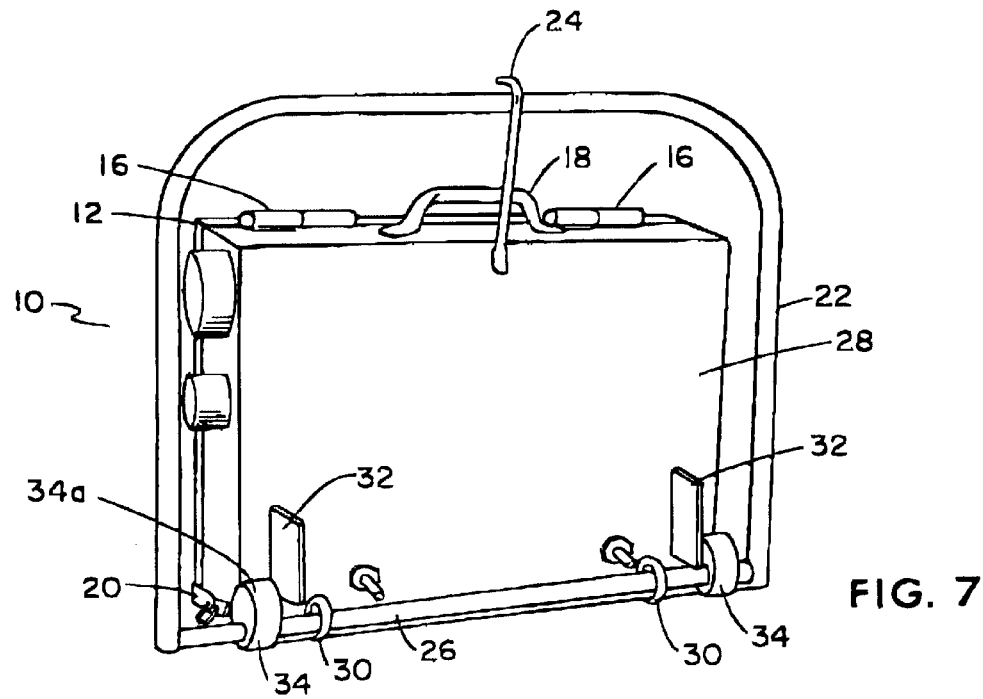
FIG. 7 is, in right side rear perspective view, the aerosol can puncturing enclosure of FIG. 1.

Handle bar 22 which when in the upright position rests against stop 24 may be rotated in a forward direction A about cam member 26. Cam member 26 is free to rotate, being mounted laterally across the back panel 28 on enclosure 10 and journalled in eyebolts 30 as best seen in FIGS. 5–7. Guide flanges 32, rigidly mounted to back panel 28, are provided to center cams 34 on cam member 26 relative to back panel 28.

Rotating handle bar 22 in direction A causes corresponding rotation of cams 34 in direction A'. Cam surfaces 34a bear on back panel 28 thereby forcing cam member 26 away from back panel 28 in direction B.

Figure 8:
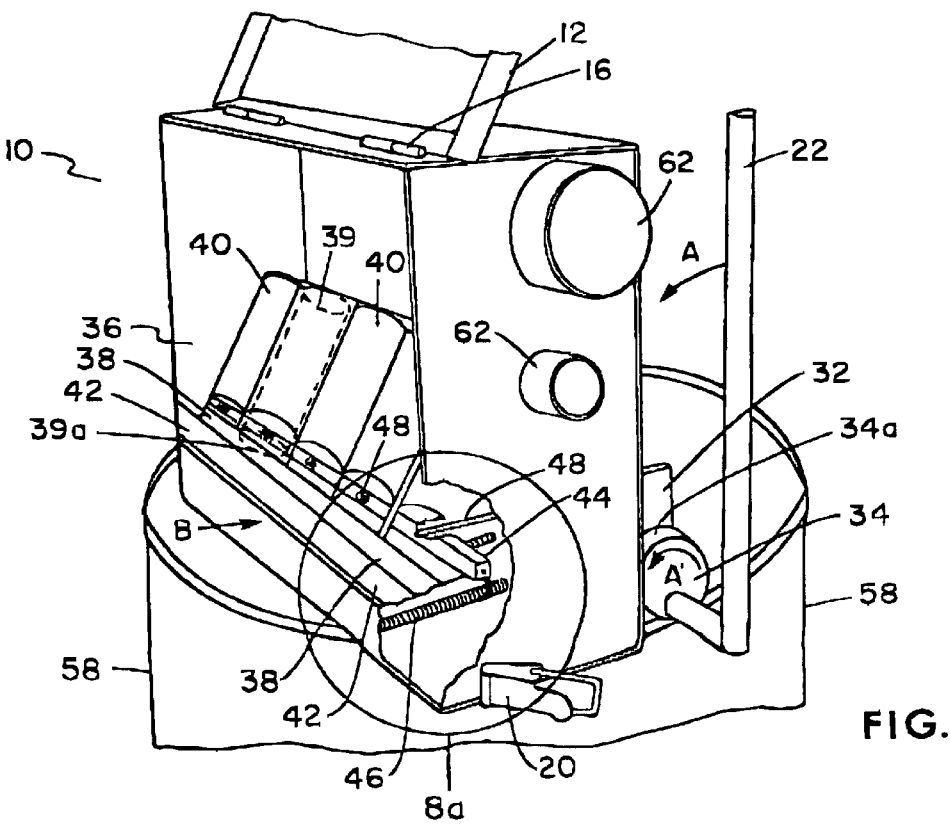
FIG. 8 is, in right side perspective view, the aerosol can puncturing enclosure of FIG. 3.

Movement of cam member 26 in direction B pulls eyebolts 30 through corresponding apertures in back panel 28. Eyebolts 30 are rigidly connected to can supporting drawer 36 better seen in FIGS. 8–10. Eyebolts 30 may be threadably mounted in corresponding nuts 33 mounted as by welding to can supporting drawer 36. Can supporting drawer 36 has floor member 38 on top of which may be rested the base rims 30a of aerosol cans 39 (one can illustrated in dotted outline in FIG. 8a) supported within curved cradles 40 for supporting an array of side-by-side upright cans 39 within enclosure 10. In the illustrated embodiment five such aerosol cans 39 may be supported at one time in cradles 40 although cradles supporting fewer or greater numbers of aerosol cans are within the scope of the present invention. Aerosol cans resting within cradles 40 are held in place relative to floor member 38 by raised flange 42 on can supporting drawer 36.

Figure 8A:
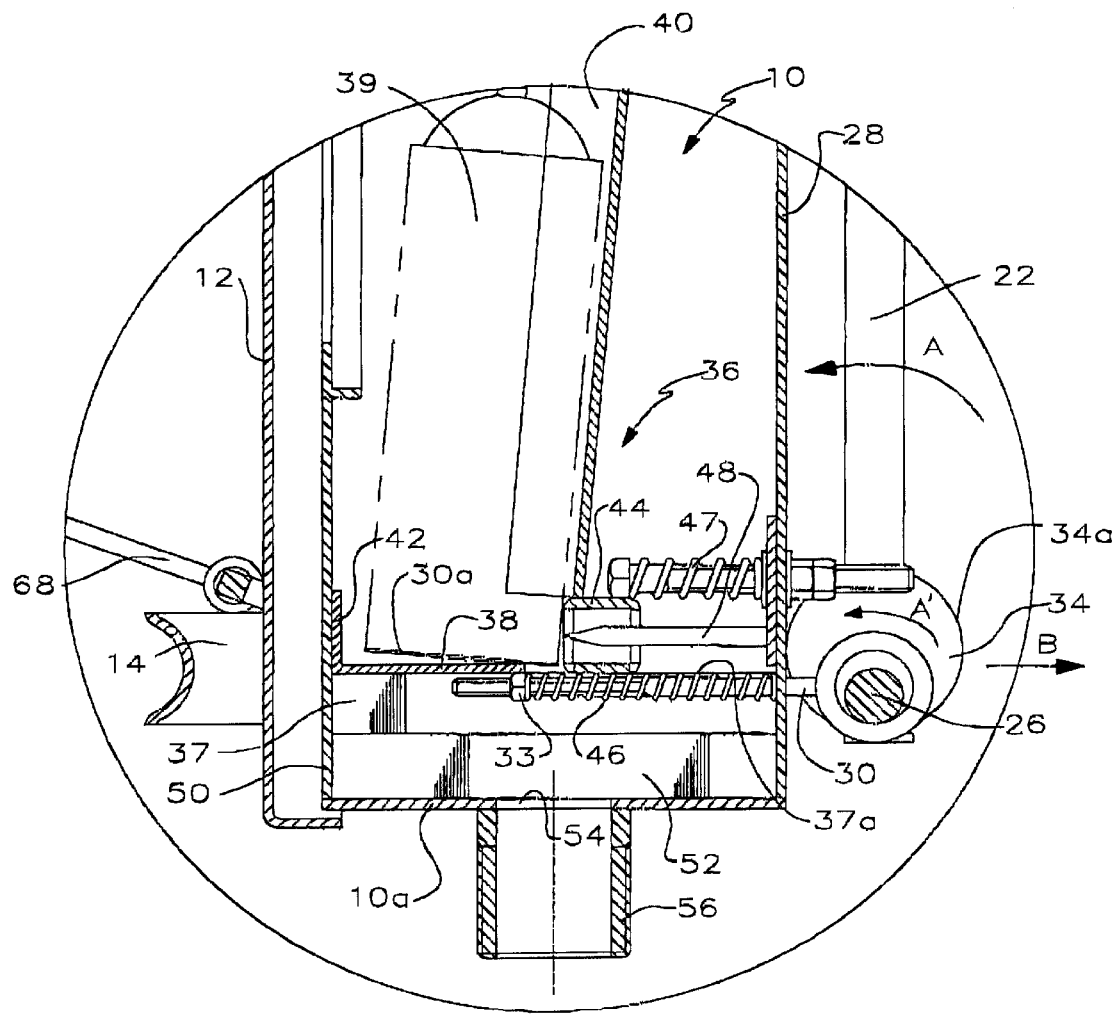
FIG. 8a is an enlarged partially cut-away view of FIG. 8.

Can supporting drawer 36 is free to slide over fixed rails 37, seen in FIGS. 8a and 9. Fixed rails 37 are rigidly mounted to the floor 10a of enclosure 10 and extend rigidly vertically to provide horizontal sliding surfaces 37a on which drawer 36 may slide. As drawer 36 slides in direction B, helical compression springs 46 mounted on eyebolts 30 are compressed between nuts 33 welded to can supporting drawer 36, and back panel 28.

The result of forcing cam member 26 away from back panel 28 by rotation in direction A of handle bar 22 is to draw can supporting drawer 36 in direction B so as to force aerosol cans resting on drawer 36 in cradles 40 against return bar 44. As can supporting drawer 36 is translated in direction B, return bar 44 is also forced in direction B against the return biasing force of helical compression springs 47 so as to expose pins 48. Springs 47 are compressed between return bar 44 and back panel 28. Pins 48 are rigidly mounted relative to back panel 28 so that movement of the aerosol cans in direction B force pins 48 into puncturing engagement with the lower sides of such cans supported in cradles 40.

Moving handle 22 in direction A from its upright position to a generally horizontal position ensures that front door 12 has been at least swung shut on hinges 16 so as to protect the user and to remind the user to engage latches 20 to secure front door 12 on enclosure 10. Once handle bar 22 is in the generally horizontal position, can supporting drawer 39 has been fully translated in direction B by the action of cams 34 rotating against back panel 28 and pins 48 have been forced through the side walls of aerosol cans 39 supported in cradles 40. Returning handle 22 from its generally horizontal position to its upright position translates can supporting drawer 36 to its originating position adjacent front door 12 under the return biasing force of springs 46. Return bar 44, in response to the return biasing force of springs 47, is returned to its original position and forces the aerosol cans supported in cradles 40 off pins 48 thereby removing the pins 48 from puncturing engagement in the sides of the aerosol cans. Fluids and gasses contained within the aerosol cans are then free to escape from the punctures formed by pins 48.

Figure 3:
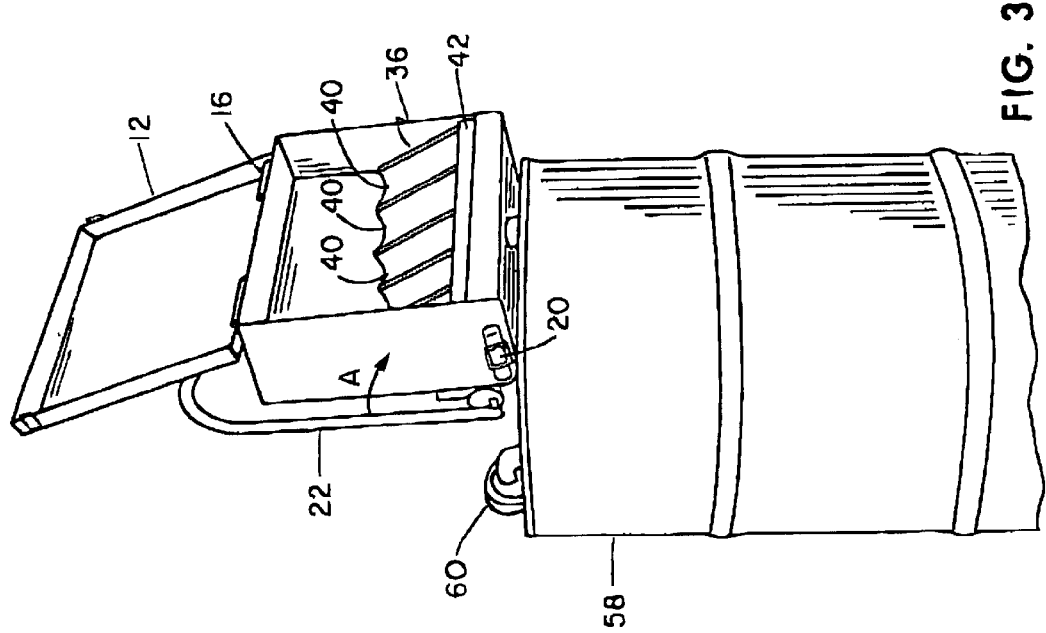
FIG. 3 is, in left side perspective view, the aerosol can puncturing enclosure of FIG. 1 in an open position mounted on a drum.

Front panel 50 encloses inclined surfaces 52 within enclosure 10 as better seen in FIG. 10 so as to direct fluids draining from aerosol cans supported in cradles 40 through aperture 54 and threaded nipple 56 into drum 58. Drum 58 is rigidly mounted in threaded engagement with threaded nipple 56. As illustrated in FIG. 3, excess gasses may be vented from drum 58 through filter 60 mounted to a corresponding aperture in drum 58.

Advantageously, collars 62 are provided so that the user may easily remove the plastic caps from the tops of typical aerosol cans prior to the aerosol cans being inserted into cradles 40.

Figure 11:
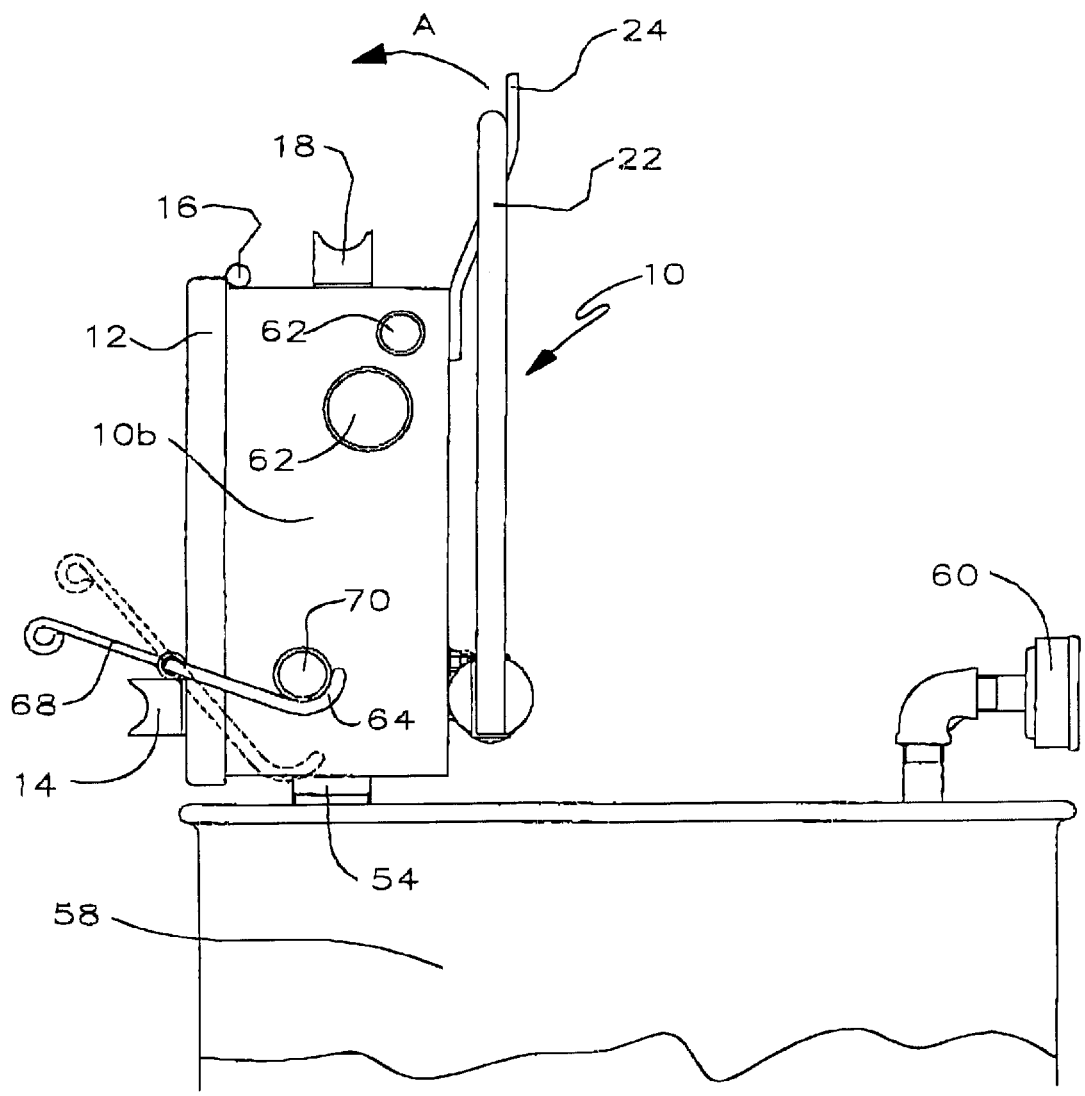
FIG. 11 is in left side elevation view, the aerosol can puncturing device of FIG. 9.

In an alternate embodiment, latch 20 is, as seen in FIGS. 9–11, replaced by J-hooks 64 rigidly mounted at the distal ends of laterally rotatably mounted shaft 66, rotatably mounted across the front of door 12. When shaft 66 is rotated by lowering lever 68, J-hooks 64 are rotated upwardly into latching engagement with rigid collars 70, rigidly mounted to sides 10b of enclosure 10. Advantageously, the curved hook end of J-hooks 64 are shaped to progressively tighten door 12 onto enclosure 10 as lever 68 is progressively lowered. Further advantageously, in this embodiment, a resilient gasket liner seals the edges of enclosure 10, between enclosure 10 and door 12.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for puncturing aerosol cans comprising:
    an enclosure having an aerosol can receiving cavity therein,
        an aerosol can cradle, for supporting aerosol cans, mounted within said aerosol can receiving cavity,
        aerosol can puncturing means mounted within said aerosol can receiving cavity,
        said aerosol can cradle and said aerosol can puncturing means mounted in sliding cooperation, wherein a selectively rotatable cam member is selectively rotatable by means of rotation of a handle, rotatably mounted to said enclosure, said rotation of said handle in a first direction of rotation, actuating said sliding cooperation by means of a mechanical linkage between said handle and said cam member, said cam member translating said cradle relative to said puncturing means so as to drive said aerosol cans in said cradle in a first direction into puncturing engagement with said puncturing means, and wherein said handle is rotatable in a second direction of rotation, opposite said first direction of rotation, to remove said aerosol cans from puncturing engagement with said aerosol can puncturing means, said enclosure mountable onto a dump reservoir, said enclosure cooperating with said dump reservoir by means of a drain between said can receiving cavity and a reservoir cavity within said dump reservoir, whereby said aerosol cans may expel their contents into said dump reservoir.

2. The device of claim 1 wherein said aerosol can puncturing means is rigidly mounted within said aerosol can receiving cavity and said aerosol can cradle, and said aerosol cans cradled thereon, are selectively slidable into said puncturing engagement with said aerosol can puncturing means.

3. The device of claim 1 wherein said puncturing means is at least one elongate pin.

4. The device of claim 3 wherein said puncturing means engages said aerosol cans at a lower end of said aerosol cans adjacent a base of said aerosol cans.

5. The device of claim 3 wherein said at least one elongate pin is generally horizontally disposed, generally perpendicular to a surface of said aerosol cans, and said aerosol cans are releasably secured within said aerosol can cradles by releasable securing means.

6. A device for puncturing aerosol cans comprising:

an enclosure having an aerosol can receiving cavity therein, an aerosol can cradle, for supporting aerosol cans, mounted within said aerosol can receiving cavity, aerosol can puncturing means mounted within said aerosol can receiving cavity, said aerosol can cradle and said aerosol can puncturing means mounted in sliding cooperation, wherein a selectively rotatable cam member is selectively rotatable by means of rotation of a handle, rotatably mounted to said enclosure, said rotation of said handle in a first direction of rotation, actuating said sliding cooperation by means of a mechanical linkage between said handle and said cam member, said cam member translating said cradle relative to said puncturing means so as to drive said aerosol cans in said cradle in a first direction into puncturing engagement with said puncturing means, and wherein said handle is rotatable in a second direction of rotation, opposite said first direction of rotation, to remove said aerosol cans from puncturing engagement with said aerosol can puncturing means, said enclosure mountable onto a dump reservoir, said enclosure cooperating with said dump reservoir by means of a drain between said can receiving cavity and a reservoir cavity within said dump reservoir, whereby said aerosol cans may expel their contents into said dump reservoir, and wherein said aerosol can puncturing means is rigidly mounted within said aerosol can receiving cavity and wherein said aerosol can cradle, and said aerosol cans cradled thereon, are selectively slidable into said puncturing engagement with said aerosol can puncturing means.

7. The device of claim 6 wherein said puncturing means is at least one elongate pin.

8. The device of claim 7 wherein said puncturing means engages said aerosol cans at a lower end of said aerosol cans adjacent a base of said aerosol cans.

9. The device of claim 8 wherein said at least one elongate pin is generally horizontally disposed, generally perpendicular to a surface of said aerosol cans, and said aerosol cans are releasably secured within said aerosol can cradles by releasable securing means.

10. The device of claim 10 wherein said aerosol can receiving cavity is closable by means of a door, said door being pivotable about a hinge secured to an upper horizontal side of said enclosure, above said can receiving cavity, wherein said door, when in an open position, blocks rotation of said handle in said first direction of rotation so as prohibit said driving of said aerosol cans in said cradle in said first direction into said puncturing engagement with said puncturing means until said door is closed.

11. The device of claim 6 wherein said cradle comprises a plurality of generally upright can supporting members, each of which is arcuately shaped, so as to snugly nest and support said aerosol cans in a generally upright and side by side parallel array.

12. The device of claim 6 wherein said enclosure for inclined surfaces positioned below said aerosol can cradle, said inclined surfaces for receiving thereon liquid contents expelled from said aerosol cans after said aerosol cans are punctured, said inclined for surfaces inclined to direct said liquid contents to said drain.

* * * * *